United States Patent
Elliott et al.

(10) Patent No.: US 6,253,312 B1
(45) Date of Patent: Jun. 26, 2001

(54) METHOD AND APPARATUS FOR DOUBLE OPERAND LOAD

(75) Inventors: Timothy A. Elliott; G. Glenn Henry; Terry Parks, all of Austin, TX (US)

(73) Assignee: IP First, L.L.C., Fremont, CA (US)

( * ) Notice: Subject to any disclaimer, the term of this patent is extended or adjusted under 35 U.S.C. 154(b) by 0 days.

(21) Appl. No.: 09/130,910

(22) Filed: Aug. 7, 1998

(51) Int. Cl.⁷ .................................................. G06F 15/00
(52) U.S. Cl. ...................... 712/222; 712/23; 712/210; 712/225
(58) Field of Search ..................... 712/1, 25, 23, 712/26, 200, 208, 220, 221, 222, 225, 210

(56) References Cited

U.S. PATENT DOCUMENTS

| | | | |
|---|---|---|---|
| 4,595,911 | * 6/1986 | Kregness et al. | 341/78 |
| 5,142,635 | * 8/1992 | Saini | 712/225 |
| 5,416,911 | * 5/1995 | Dinkjian et al. | 712/225 |
| 5,481,734 | * 1/1996 | Yoshida | 712/225 |
| 5,497,468 | * 3/1996 | Tani et al. | 712/225 |
| 5,678,016 | * 10/1997 | Eisen et al. | 712/216 |
| 5,778,247 | * 7/1998 | Tremblay | 712/23 |
| 5,787,025 | * 7/1998 | Muwafi et al. | 708/490 |
| 5,940,311 | * 8/1999 | Dao et al. | 708/204 |

* cited by examiner

*Primary Examiner*—Daniel H. Pan
*Assistant Examiner*—Dzung Nguyen
(74) *Attorney, Agent, or Firm*—Richard K. Huffman; James W. Huffman

(57) ABSTRACT

An apparatus and method are provided for concurrently loading single-precision operands into registers in a microprocessor floating point register file. The apparatus includes translation logic, data logic, and write back logic. The translation logic receives a load macro instruction prescribing an address, and decodes the load macro instruction into a double load micro instruction. The double load micro instruction directs the microprocessor to retrieve the two single-precision operands from the address and to load the two single-precision operands into the two floating point registers. The data logic, coupled to the translation logic, executes the double load micro instruction and retrieves the two single-precision operands from the address. The write back logic, coupled to the data logic, loads the two single-precision operands into the two floating point registers during a single write cycle.

30 Claims, 7 Drawing Sheets

FIG. 4 (Related Art)

*Retrieval of Two Single-Precision Operands* /400

| Cycle | Translate | Register | Address | Data/ALU | Write Back |
|-------|-----------|----------|---------|----------|------------|
| 1 | *** | *** | *** | *** | *** |
| 2 | FLD [EBX+2] | *** | *** | *** | *** |
| 3 | FLD [EBX+6] | FLDSP [EBX+2] | *** | *** | *** |
| 4 | *** | FLDSP [EBX+6] | FLDSP [EBX+2] | *** | *** |
| 5 | *** | *** | FLDSP [EBX+6] | FLDSP [EBX+2] | *** |
| 6 | *** | *** | *** | FLDSP [EBX+6] | FLDSP [EBX+2] |
| 7 | *** | *** | *** | *** | FLDSP [EBX+6] |
| 8 | *** | *** | *** | *** | *** |

2 CYCLES

FIG. 6

*Double Load of Two Single-Precision Operands*

| Cycle | Translate | Register | Address | Data/ALU | Write Back | |
|---|---|---|---|---|---|---|
| 1 | *** | *** | *** | *** | *** | |
| 2 | FLD2 [EBX+2] | *** | *** | *** | *** | |
| 3 | *** | FLD2SP [EBX+2] | *** | *** | *** | |
| 4 | *** | *** | FLD2SP [EBX+2] | *** | *** | |
| 5 | *** | *** | *** | FLD2SP [EBX+2] | *** | |
| 6 | *** | *** | *** | *** | FLD2SP [EBX+2] | 1 CYCLE |
| 7 | *** | *** | *** | *** | *** | |

METHOD AND APPARATUS FOR DOUBLE OPERAND LOAD

BACKGROUND OF THE INVENTION

1. Field of the Invention

This invention relates in general to the field of data processing in computers, and more particularly to an apparatus and method for loading single-precision operands into floating point registers during execution of a single load instruction.

2. Description of the Related Art

Software programs that execute on a microprocessor consist of macro instructions that together direct the microprocessor to perform a function. Each macro instruction directs the microprocessor to perform a specific operation that is part of the function such as loading data from memory, storing data in a register, or adding the contents of two registers.

A macro instruction may prescribe a simple operation, such as moving the contents of one register location to another register location. In contrast, it may prescribe a complex operation, such as deriving the cosine of a floating point number. Compared to the manipulation of integer data, the manipulation of floating point data by the microprocessor is complex and time consuming. Movement of integer data requires only a few cycles of a microprocessor clock; derivation of a cosine requires hundreds of machine cycles. Because floating point operations are basically more complex than integer operations, conventional microprocessors employ a dedicated floating point unit to improve the speed and efficiency of floating point calculations. The dedicated floating point unit may be part of the same mechanical package as the remainder of the microprocessor or it may reside in a separate mechanical package.

Within an x86-compatible microprocessor, a floating point macro instruction is decoded into a sequence of floating point micro instructions that direct the microprocessor to execute a floating point operation. The sequence of floating point micro instructions is passed to the floating point unit. The floating point unit executes the sequence of floating point micro instructions and provides a result of the floating point operation in a result register. Likewise, an integer macro instruction is decoded into a sequence of integer micro instructions that direct the microprocessor to execute an integer operation. The sequence of integer micro instructions is passed to the integer unit. The integer unit executes the sequence of integer micro instructions and provides a result of the integer operation in a result register.

Historically, the architecture of x86-compatible microprocessors has been such that integer unit logic is used to perform memory accesses, to include loading floating point operands from memory into registers in the floating point unit. The address in memory of an individual floating point operand is specified according to specific x86 addressing conventions. The floating point operands are retrieved from memory and are provided to the floating point unit over a write back bus. But, x86 instruction set architecture only provides the capability to load one floating point operand at a time. To load 10,000 floating point operands requires execution of 10,000 load instructions, which essentially equates to 10,000 instruction cycles in a conventional microprocessor. The format of a floating point operand to be loaded is prescribed by the load instruction. It can be single-precision (32 bits in length), double-precision (64 bits), or extended-precision (80 bits). Thus, present day microprocessors provide the capability to load an 80-bit floating data block from memory into a floating point register during execution of a single instruction, but they restrict the number of floating point operands to one that can be loaded in a single instruction cycle.

Such restriction has not been heretofore problematic, because floating point applications have primarily comprised scientific and financial routines which have not had execution time constraints. In other words, the time required to load operands from memory did not have a negative impact on most of the floating point applications of years past. But, with the proliferation of graphics applications in more recent years, the time required to load operands from memory has become an area of concern.

Graphics applications are unique in the sense that they typically perform simple floating point operations on lots of operands in a limited period of time. These operands represent various attributes of an image on a video monitor. As such, the requirements for precision normally accorded to more conventional floating point applications do not apply. In fact, no more than single-precision operands are required for most graphics applications. Moreover, because images viewed by the human eye are subject to human factors considerations, the speed with which an image is processed for display on a video monitor is of critical importance to a designer. And the time required to load the thousands of operands representing that image has become a bottleneck in many applications.

Therefore, what is needed is a microprocessor that loads floating point operands from memory much faster than has previously been provided.

In addition, what is needed is a microprocessor that can prescribe the address of a data block comprising two single-precision operands according to x86 addressing conventions, and load the single-precision operands into two prescribed floating point registers during a single instruction cycle.

Furthermore, what is needed is a method for concurrently loading two adjacent single-precision operands in a microprocessor that eliminates unnecessary instruction cycles associated with the calculation of an address associated with one of the two operands.

SUMMARY

To address the above-detailed deficiencies, it is an object of the present invention to provide a microprocessor for loading adjacent single-precision operands into adjacent floating point registers by execution of a single instruction.

Accordingly, in the attainment of the aforementioned object, it is a feature of the present invention to provide a microprocessor for executing a load macro instruction, where the load macro instruction directs the microprocessor to load two single-precision operands into two floating point registers. The microprocessor includes translation logic, data logic, and write back logic. The translation logic receives the load macro instruction, the load macro instruction prescribing an address, and decodes the load macro instruction into a double load micro instruction, where the double load micro instruction directs the microprocessor to retrieve the two single-precision operands from the address and to load the two single-precision operands into the two floating point registers. The data logic is coupled to the translation logic. The data logic receives and executes the double load micro instruction, and retrieves the two single-precision operands from the address. The write back logic is coupled to the data logic, and loads the two single-precision operands into the two floating point registers during a single write cycle.

An advantage of the present invention is that unnecessary delays associated with the loading of operands representing a screen image in a graphics program are eliminated.

Another object of the present invention is to provide an apparatus in a microprocessor that can load two single-precision operands into two floating point registers, where the address of a data block containing both operands is prescribed according to x86 addressing conventions.

In another aspect, it is a feature of the present invention to provide an apparatus for employing a load macro instruction to load two single-precision operands into two floating point registers in a microprocessor. The apparatus has translation logic, data logic, and write back logic. The translation logic receives the load macro instruction prescribing an address of the two single-precision operands, and decodes the load macro instruction into a double load micro instruction. The double load micro instruction directs the microprocessor to retrieve a 64-bit data block from the address and to load the two single-precision operands into the two floating point registers. The data logic is coupled to the translation logic. The data logic receives and executes the double load micro instruction, and retrieves the 64-bit data block from the address. The data logic includes a router that extracts a first single-precision operand and a second single-precision operand from the 64-bit data block. The write back logic is coupled to the data logic. The write back logic loads the first single-precision operand into a first floating point register and the second single-precision operand into a second floating point register during a single write cycle.

In yet another aspect, it is a feature of the present invention to provide an apparatus in a microprocessor for performing a double load of single-precision operands, the double load being responsive to execution of a double load macro instruction by the microprocessor. The apparatus has a decoder and data access logic. The decoder receives and translates the double load macro instruction. The double load macro instruction includes an operand format field, indicating that the double load is to be performed on operands in single-precision format; address component fields, prescribing a location of a first single-precision operand; and a register specifier field, specifying a first floating point register into which the first single-precision operand is to be loaded. The data access logic is coupled to the decoder. The data access logic concurrently retrieves the first single-precision operand and a second single-precision operand. The second single-precision operand is located in memory next to the first single-precision operand.

Another advantage of the present invention is that a block of single-precision operands can be loaded from memory in roughly half of the time required by a conventional microprocessor.

Yet another object of the present invention is to provide a method for concurrently loading two adjacent single-precision operands in a microprocessor much faster than has heretofore been provided.

In a further aspect, it is a feature of the present invention to provide a method in a microprocessor for loading two single-precision operands into two floating point registers during a single write cycle. The method includes providing a double load macro instruction, the double load macro instruction prescribing an address of the two single precision operands, and directing the microprocessor to concurrently load the two singleprecision operands from memory; translating the double load macro instruction into a double load micro instruction that directs the microprocessor to retrieve a 64-bit data block and to parse the 64-bit data block into the two single-precision operands; and loading the two single-precision operands into the two floating point registers during write back of the double load micro instruction.

Yet another advantage of the present invention is that two single-precision operands can be loaded into a microprocessor during a single write back cycle.

BRIEF DESCRIPTION OF THE DRAWINGS

These and other objects, features, and advantages of the present invention will become better understood with regard to the following description, and accompanying drawings where:

FIG. 4 is a table illustrating execution of instructions by the microprocessor of FIG. 4 to retrieve two single-precision operands from memory.

FIG. 6 is a table illustrating execution of a single instruction by the microprocessor of FIG. 5 to retrieve two single-precision operands from memory.

DETAILED DESCRIPTION

In view of the above background on techniques for loading floating point operands in a microprocessor, several related art examples will now be described with reference to FIGS. 1 through 4. These examples illustrate the problematic nature of present day techniques when employed in an x86-compatible microprocessor to retrieve multiple single-precision operands, particularly when such techniques are used in a graphics application comprising the manipulation of thousands of operands. Following this discussion, a detailed description of the present invention will be provided with reference to FIGS. 5 through 7. Use of the present invention allows single-precision operands to be loaded into a floating point register file much faster than has heretofore been provided.

Figure 1:
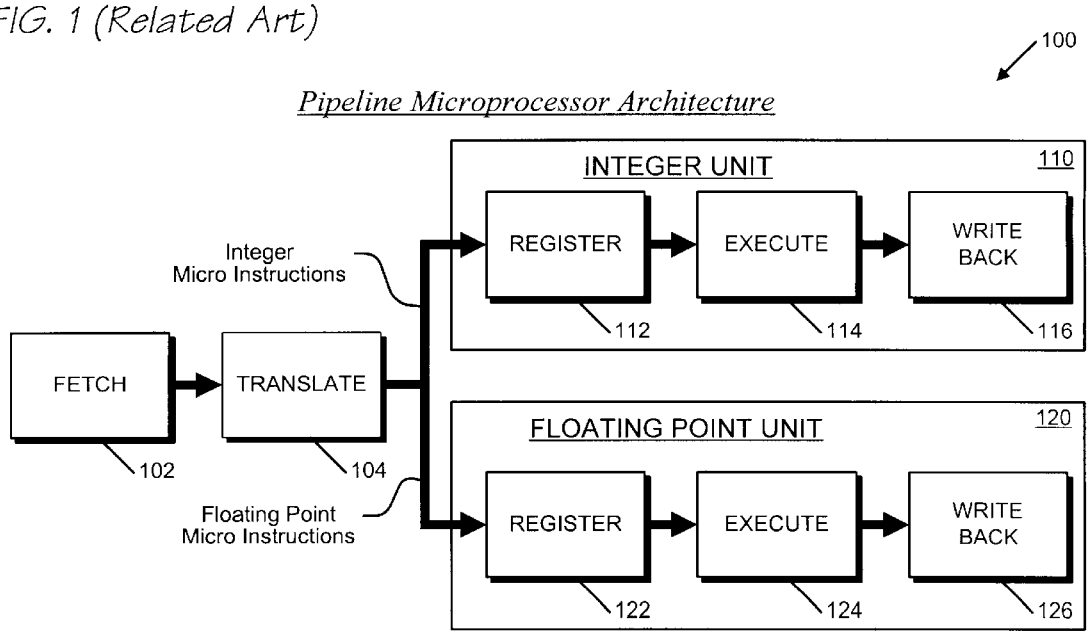
FIG. 1 is a block diagram of a related art pipeline microprocessor featuring parallel integer and floating point execution units.

Referring to FIG. 1, a block diagram of a related art pipeline microprocessor 100 is presented. The microprocessor 100 includes a fetch stage 102, a translate stage 104, an integer unit 110, and a floating point unit 120. The floating point unit 120 is in parallel with the integer unit 110. The integer unit 110 has three stages: register 112, execute 114, and write back 116. The floating point unit 120 has three like stages: register 122, execute, 124, and write back 126. A specific microprocessor may functionally decompose into its floating point unit and integer unit into slightly more or less stages. Although only three stages are shown within the integer unit 110 and the floating point unit 120 in FIG. 1, one skilled in the art will appreciate that such stages are representative of a typical present day microprocessor 100.

Operationally, the fetch stage 102 fetches macro instructions from memory (not shown) for execution by the microprocessor 100. The translate stage 104 translates, or decodes, a fetched macro instruction into associated micro instructions, each directing the microprocessor to perform a specific subtask related to accomplishment of a higher level operation, which is specified by the fetched macro instruction. Because of fundamental differences between operations involving integers and operations involving floating point numbers, microprocessor designers have historically segregated hardware and associated macro instructions for the performance of floating point subtasks from that required to perform integer subtasks.

Thus, the translate stage 104 decodes a floating point macro instruction into a sequence of floating point micro instructions to accomplish a specified floating point operation. Likewise, the translate stage 104 decodes an integer macro instruction into a sequence of integer micro instructions to accomplish a specified integer operation. The integer micro instructions are passed from the translate stage 104 to the integer unit register stage 112. The integer unit register stage 112 retrieves operands specified by the integer micro instructions from a register file (not shown) for use by later stages in the integer pipeline. The integer unit execute stage 114 executes subtasks specified by the integer micro instructions. Examples of subtasks performed by the execute stage 114 include address calculation, integer arithmetic, and retrieval/storage of data from/to memory. The integer unit write back stage 116 writes results of the executed subtasks back into the register file.

Likewise, the floating point micro instructions are passed from the translate stage 104 to the floating point unit register stage 122. The floating point unit register stage 122 retrieves operands prescribed by the floating point micro instructions from a floating point register file (not shown), for use by later stages in the floating point pipeline. The floating point unit execute stage 124 executes floating point subtasks specified by the floating point micro instructions. Examples of subtasks performed by the floating point execute stage 124 include floating point arithmetic, square root, and transcendental functions (i.e., sine, cosine, etc.). The floating point unit write back stage 126 writes results of the executed subtasks back into the floating point register file.

Micro instructions move through successive stages of the microprocessor pipeline in synchronization with a microprocessor clock. Optimally, while any given stage in the pipeline is executing a micro instruction, the previous stage should be executing the next, or following, micro instruction. If a preceding micro instruction within one stage requires more than one cycle to completely execute, then following micro instructions are stalled until execution of the preceding micro instruction is completed. When a stall occurs, pipeline slips are inserted into the pipeline to insure that the following micro instructions do not prematurely advance in the pipeline.

In contrast to the integer unit 110, the floating point unit 120 has complex computational logic that is dedicated to performing floating point data manipulations. For example, addition of two integers in the integer unit 110 takes roughly one cycle of a microprocessor clock while calculation of the cosine of an operand in the floating point unit 120 requires hundreds of clock cycles.

For the floating point unit 120 to execute floating point operations, the associated floating point operands must be loaded from memory. To load a floating point operand from memory requires that it be retrieved by the integer unit 110. This is because the floating point unit 120 does not directly access memory. Rather, the integer unit write back stage 116 includes a bus (not shown) whereby floating point operands are provided to the floating point unit 120 after they are retrieved from memory.

Figure 2:
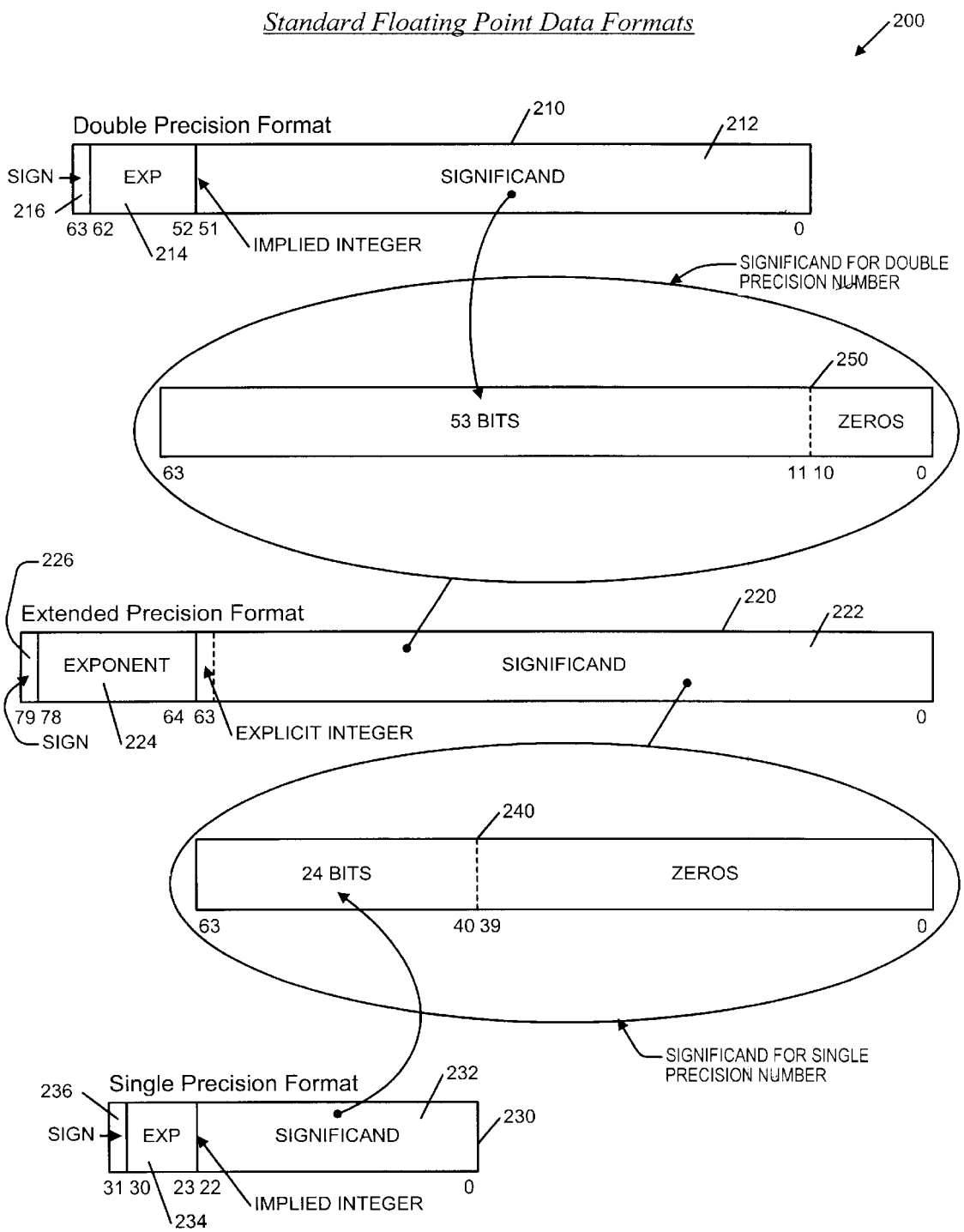
FIG. 2 is a diagram depicting industry standard formats for floating point operands.

As desktop computing systems have become increasingly more common in the workplace, requirements for microprocessor instructions that perform complex floating point operations have placed more of a burden on floating point hardware to execute these floating point macro instructions without undue delay. In addition, floating point applications are so widespread now that most microprocessors process floating point data in accordance with accepted industry standards. These standards denote various formats for binary representation of floating point numbers along with rules for calculating and interpreting floating point results. FIG. 2 more specifically describes floating point number formats.

Referring to FIG. 2, a diagram 200 is presented illustrating the predominant industry standard formats for representation of floating point numbers. The standard most widely adhered to for x86-compatible desktop applications is IEEE Std 754-1985, *IEEE Standard for Binary Floating-Point Arithmetic*. The diagram 200 presents three commonly used formats from the standard: double-precision format 210, extended-precision format 220, and single-precision format 230. Typical x86-compatible floating point units execute floating point micro instructions on operands provided in the extended-precision format 220, however, the operands can be stored in memory in any of the three formats 210, 220, 230. Thus, the diagram 200 also depicts an extended-precision significand 240 resulting from translation of an operand stored in the single-precision format 230 and an extended-precision significand 250 resulting from translation of an operand stored in the double-precision format 210.

An operand stored in the single-precision format 230 includes a sign bit 236, an 8-bit exponent 234, and a 23-bit significand 232. The sign bit 236 indicates whether the operand is positive or negative. The exponent 234 is a biased indication of the power of base two to which the significand 232 is raised. The significand 232 includes an integer part and a fraction part. With the exception of zero, the integer part for all encoded floating point numbers is equal to one. And since zero has a unique encoding, i.e., both the exponent 234 and the fraction part are set to zero, then it is not necessary to explicitly store the integer part. Consequently, the diagram 200 shows that the integer part is implied in the single-precision format 230 rather than explicitly depicted. The 23 bits of the significand 232 are the fraction bits.

An operand stored in the double-precision format 210 includes a sign bit 216, an 11-bit exponent 214, and a 52-bit significand 212. The sign bit 216 indicates whether the operand is positive or negative. The exponent 214 is a biased indication of the power of base two to which the significand 212 is raised. The significand 212 includes an integer part and a fraction part. Like the single-precision format 230, the integer part of the double-precision format 310 is implied rather than explicitly depicted. The 52 bits of the significand 212 are the fraction bits.

An operand in the extended-precision format 220 includes a sign bit 226, a 15-bit exponent 224, and a 64-bit significand 222. The sign bit 226 indicates whether the operand is positive or negative. The exponent 224 is a biased indication of the power of base two to which the significand 222 is raised. The significand 222 includes an integer part and a fraction part. Unlike the single- or double-precision format 230, 210, the extended-precision format explicitly depicts the integer part of an encoded floating point number. The integer part is one bit and the remaining 63 bits of the significand 222 are the fraction bits.

In an x86-compatible microprocessor, operands may be stored in the single-precision format 230 and the double-precision format 210 only in memory. When an operand is retrieved from memory into a floating point register file, it is translated into the extended-precision format 220. All floating point operations are performed on operands provided in extended-precision format 220 to produce results in extended-precision format 220. An extended-precision result may be written to memory in any of the three standard formats 210, 220, 230. When it is written to memory in single- or double-precision format 230, 210, the extended-precision result is appropriately rounded or truncated.

When a number in double-precision format 210 is translated to extended-precision format 320, its significand 250 includes an integer bit, the 52-bit significand 212, and 11 appended zeros. When a number in single-precision format 230 is translated to extended-precision format 220, its significand 240 includes an integer bit, the 23-bit significand 232, and 40 appended zeros. At first glance, it may appear that operands stored in single- or double-precision format 230, 210 carry a number of insignificant significand bits when provided to a floating point unit. Yet, multiplication of a single-precision operand by another single-precision operand will yield a result having approximately twice the number of significant bits of either of the two operands. Hence, simple operations performed on single-precision operands can easily yield 64 significant significand bits in an extended-precision result.

A majority of the floating point computations performed on desktop computer systems have historically been confined to scientific and financial realms. For these kinds of applications, the highest level of precision that a microprocessor can provide, in both computation and result, is typically favored. For this reason, microprocessor designs have migrated toward exclusively providing extended-precision computational hardware. As stated above, operands and results provided in single- or double-precision formats 230, 210 are translated to and from extended-precision format 220 upon entering and leaving a floating point unit. And, since most scientific and financial applications have no critical time constraints, i.e., they are not "real-time" applications, the delays incurred due to format translation are not overly burdensome. For this same reason, x86 instructions for loading floating point operands provide only a minimal capability to load one operand at a time. The operand may be in single-precision format 230, double-precision format 210, or extended-precision format 220. The capability is also provided to use all of the x86 architectural addressing means for addressing the operand in memory. But, each time a floating point operand is loaded, all of the steps associated with memory access must be performed, include to derivation of the address. For the retrieval of a few floating point operands in an application without real-time constraints, constraining operand loads so that each individual operand must be addressed in order to be accessed is tolerable.

While the above constraints on floating point operand retrieval have not caused problems for those more traditional floating point applications, i.e., applications without time constraints, the disadvantages of such an architectural approach have become more apparent in recent years. Today, graphics applications comprise a significant portion of floating point applications. Furthermore, graphics applications differ from more traditional applications in three notable ways: 1) they typically have execution time constraints, particularly with respect to human factors considerations; 2) their operands are stored in the single-precision format 230; and 3) their associated computations process thousands of single-precision operands representing video monitor pixel attributes. Consequently, each time a graphics application processes a screen image, it must execute a number of single-precision floating point load operations commensurate with the number of operands representing the screen image. And, since virtually all graphics applications store their associated floating point operands in adjacent locations, to have to derive an address for each of the locations prior to loading each floating point operand wastes valuable program execution time. One skilled in the art will appreciate that the cumulative effect of such non-essential computations performed for many thousands of pixels can add significant delay to the execution time of a given graphics application. For time-critical applications, such delays are unacceptable.

Most desktop graphics applications today are composed to execute on x86-compatible microprocessor. As a result, any apparatus for improvement must provide the same x86 addressing means as are currently provided. Such constraints on a solution for the operand retrieval problem are more clearly understood when seen from the operational context of a typical pipeline microprocessor, such as that shown in FIG. 3.

Figure 3:
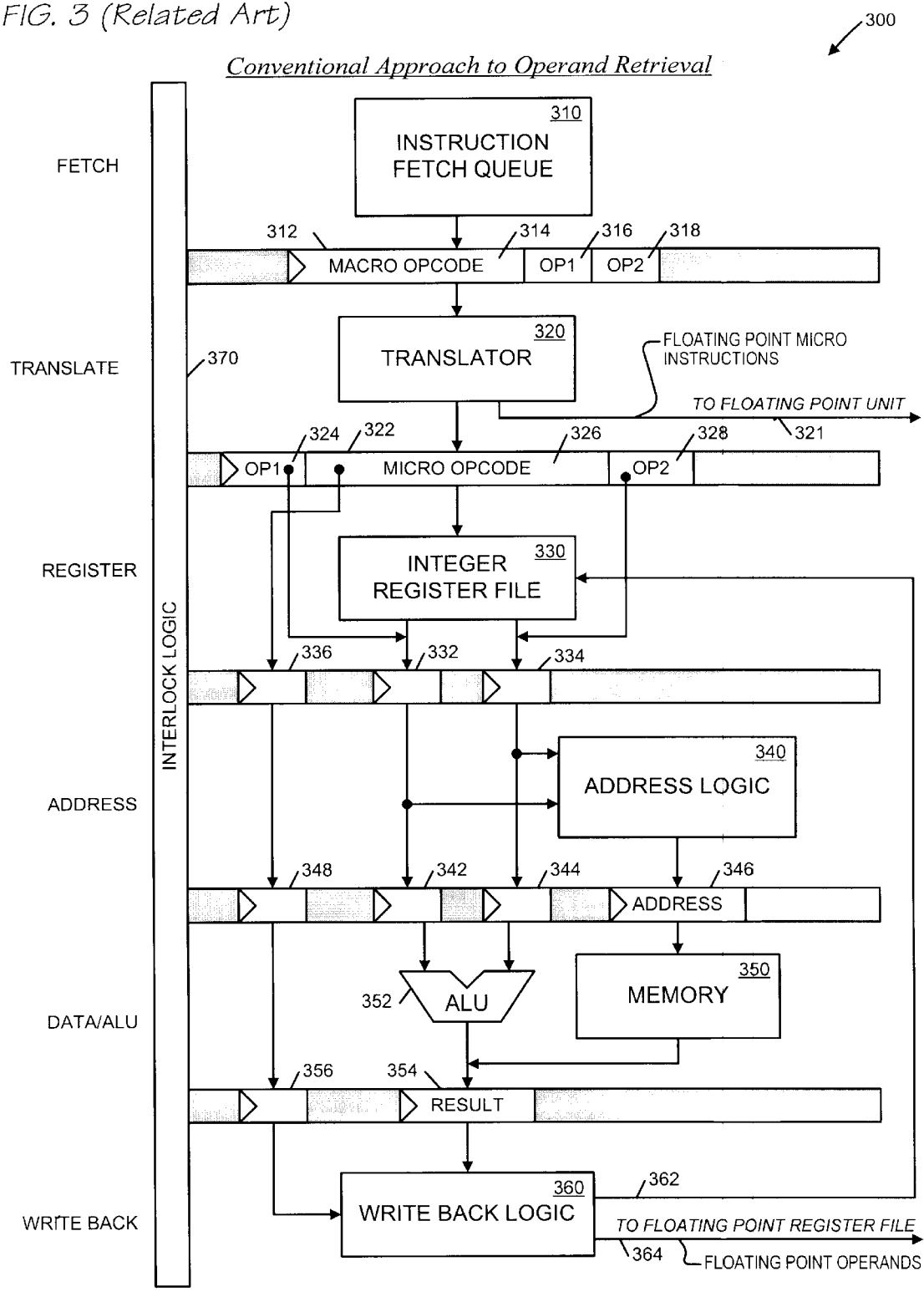
FIG. 3 is a block diagram of a related art pipeline microprocessor for retrieving single-precision operands from memory.

FIG. 3 is a block diagram of a related art pipeline microprocessor 300 for retrieving single-precision operands from memory. Although the single-precision operands are provided to a floating point register file (not shown) in the microprocessor 300, the single-precision operands are addressed and retrieved by integer stage logic. Thus, for clarity, floating point logic stages are not shown in the block diagram because they are not relevant to this discussion. The block diagram shows six pipeline stages associated with retrieval of single-precision operands: fetch, translate, register, address, data/ALU, and write back. Although a specific microprocessor may segregate its logic differently into slightly more or less stages, one skilled in the art, nonetheless, will appreciate that the stages shown in FIG. 3 are representative of a typical microprocessor 300. The microprocessor 300 also includes interlock logic 370.

The fetch stage has an instruction fetch queue 310 connected to an instruction buffer 312. The translate stage has a translator 320 that provides an output to a micro instruction buffer 322. The register stage has an integer register file 330. Outputs of the integer register file 330 are provided to first and second operand registers 332, 334. The address stage has address logic 340, which provides an output to an address register 346. The data/ALU stage has and arithmetic logic unit (ALU) 352, which provides an output to a result register 354. Operands fetched from memory 350 are also provided to the result register 354. The write back stage includes write back logic 360, which provides integer outputs to the integer register file 330 over an integer write back bus 362 and floating point outputs to the floating point register file over a floating point write back bus 364.

In operation, the instruction fetch queue 310 fetches macro instructions from memory 350 for execution by the microprocessor 300. Interface of the instruction fetch queue 310 to memory 350 is not shown. The macro instructions are sequentially provided to the instruction buffer 312. The instruction buffer 312 has three fields: a macro opcode field 314, a first macro operand field 316, and a second macro operand field 318. The macro opcode field 314 directs the microprocessor 300 to perform an operation related to operands provided in the first and second macro operand fields 316, 318. Contents of the fields 316, 318 may either directly provide the operands, or they may specify register locations, or they may contain address components from which addresses in memory are derived by logic in later stages of the pipeline. In the case of a macro instruction for loading a single-precision floating point operand, contents of the macro opcode field 314, i.e., the macro opcode, would direct the microprocessor 300 to derive an address in memory 350 of the single-precision operand using address components provided in the first and second macro operand fields 316, 318. Furthermore, the macro opcode would direct the microprocessor 300 to retrieve the single-precision operand from the derived address and load it into a prescribed register in the floating point register file. In an x86-compatible microprocessor 300, the register where the retrieved operand is to be placed is implicitly specified by the macro opcode.

The translator 320 retrieves a macro instruction from the macro instruction buffer 312 and decodes it into an associated sequence of micro instructions. Micro instructions directed to the floating point unit are provided on bus 321. Micro instructions directed to the integer unit are provided to the integer micro instruction buffer 322. The integer micro instruction buffer 322 has three fields. Contents of a micro opcode field 326 direct the integer unit to perform a specific subtask. Operands are provided in first and second micro operand fields 324, 328. In the event of a single-precision load micro instruction, the micro opcode field 326 directs the microprocessor 300 to derive the address of the single-precision operand using the address components provided in the first and second micro operand fields 324, 328 and place it into the register in the floating point register file. Like the macro opcode, the micro opcode implicitly prescribes the register where the retrieved operand is to be placed. Thus, micro instructions are provided to the integer unit of the microprocessor 300.

If the micro opcode so directs, contents of the integer register file 330 are retrieved and placed into the first and second operand registers 332, 334. For example, one method of addressing an operand in an x86-compatible microprocessor prescribes that contents of a register, say register EBX, in the integer register file 330, be added to contents of the second micro operand register 328, a displacement, to form an effective address within a memory segment. Although a complete description of x86-compatible addressing modes is beyond the scope of this paper, one skilled in the art will concur that the example given above is typical of that found in a graphics application. Thus, for the example above, contents of register EBX are retrieved from the integer register file 330 and are placed into the first operand register 332. The displacement is placed into the second operand register 334. Likewise, the micro opcode is placed into the opcode register 336.

Address logic 340 in the address stage uses the contents of the first and second operand registers 332, 334, along with contents of a segment base register (not shown) to derive the address of the operand specified for retrieval by the micro opcode. This address is placed into the address register 346. Additionally, if the micro opcode so directs, contents of registers 336, 332, and 334 are provided to registers 348, 342, and 344, respectively.

Logic in the data/ALU stage performs accesses to memory 350 and also integer calculations. The ALU 352 performs integer calculations on the operands provided in registers 342 and 344. If the micro opcode in register 348 directs retrieval of an operand from memory 350, then logic in the data/ALU stage accesses the memory 350 at the address provided in the address register 346 and retrieves a data block of a size prescribed by the micro opcode. For retrieval of a single-precision operand, the micro opcode would direct the data/ALU logic to retrieve a 32-bit data block. For retrieval of a double-precision operand, the micro opcode would the data/ALU logic to retrieve a 64-bit data block. For retrieval of an extended-precision operand, the micro opcode would the data/ALU logic to retrieve an 80-bit data block. Depending upon the specific operation performed in the data/ALU stage, either a computational result from the ALU 352 is placed into the result register 354, or the retrieved data block, the operand, is placed into the result register 354. Additionally, the micro opcode is provided to register 356. Because only one operand can be retrieved from memory at a time, for floating point operand loads, contents of the result register 354 comprise a single operand, regardless of its format.

The write back logic 360 retrieves results from the result register 354 and, if specified by the micro opcode, updates registers in the integer register file 330 over the bus 362. The write back logic 360 also provides operands to the floating point register file over bus 364. For floating point operand loads, contents of register 356, the micro opcode, prescribe the format of the retrieved operand in the result register 354 and its target register in the floating point register file.

When an instruction requires more than one pipeline cycle to execute in a given stage of the microprocessor 300, the interlock logic 370 inserts slips into the pipeline to preclude following instructions from prematurely advancing.

As described above, a macro instruction is executed in an x86-compatible microprocessor 300 each time an application retrieves a floating point operand from memory 350, regardless of the format of the operand. It follows then, that retrieval of 1,000 floating point operands requires execution of 1,000 associated macro instructions. One skilled in the art will appreciate that execution of the 1,000 associated macro instructions requires 1,000 machine cycles, discounting slips inserted by the interlock logic 370. Execution of instructions to load single-precision operands is more fully described with reference to FIG. 4.

FIG. 4 is a table 400 illustrating execution of two macro instructions by the microprocessor 300 of FIG. 3 to retrieve two single-precision operands adjacently located in memory 350. For clarity purposes, depiction of the fetch stage is not depicted because it is not relevant to the discussion. A first macro instruction is designated by FLD [EBX+2]. It directs the microprocessor 300 to compute a first address in memory 350 for a first single-precision operand based upon contents of register EBX in the integer register file 330 and a first provided displacement, 2. It also directs that the first single-precision operand be retrieved from memory 350 and placed into a first floating point register in the floating point register file. A second macro instruction is designated by FLD [EBX+6]. It directs the microprocessor 300 to compute a second address in memory 350 for a second single-precision operand based upon the same contents of register EBX and a second provided displacement, 6. Because single-precision operands are 32-bits in length, i.e., four bytes, the second provided displacement is used to derive the second address such that it is four bytes higher in memory 350 than the first address. The second macro instruction also directs that the second single-precision operand be retrieved from memory 350 and placed into a second floating point register in the floating point register file. Various techniques are used today to prescribe registers in floating point register files, a stack technique being one example. But, whether the stack technique is used to specify registers or another technique is employed by the microprocessor 300, one skilled in the art will concur that for this discussion, it is sufficient to note that the registers are implicitly prescribed by each of the two macro instructions. Progression of the two macro instructions through the microprocessor 300 is shown with respect to cycles of a pipeline clock. Instructions before and after instructions of interest are designated by "***."

During cycle 2, the first macro instruction, FLD [EBX+2], proceeds through the translate stage of the pipeline. The translator 320 retrieves the first macro instruction from the macro instruction buffer 314. Contents of the first macro operand register 316 prescribe register EBX. The first provided displacement, 2, is contained in the second macro operand register 318. The translator 320 decodes the first macro instruction into a first single-precision load micro instruction, designated by FLDSP [EBX+2]. It directs the microprocessor 300 to compute the first address as described above, to retrieve the first single-precision operand from memory 350, and to place it into the first floating point register in the floating point register file. Contents of the first micro operand register 324 prescribe register EBX. The first provided displacement, 2, is provided in the second micro operand register 328.

During cycle 3, the first single-precision load micro instruction, FLDSP [EBX+2], proceeds through the register stage. Therein, contents of register EBX are retrieved from the integer register file 330 and are provided to the first operand register 332. In addition, the first provided displacement, 2, is placed in the second operand register 334 and the micro opcode is placed into register 336. Also during cycle 3, the second macro instruction proceeds through the translate stage of the pipeline. The translator 320 retrieves the second macro instruction from the macro instruction buffer 314. As before, contents of the first macro operand register 316 prescribe register EBX. The second provided displacement, 6, is contained in the second macro operand register 318. The translator 320 decodes the second macro instruction into a second single-precision load micro instruction, designated by FLDSP [EBX+6]. It directs the microprocessor 300 to compute the second address, to retrieve the second single-precision operand from memory 350, and to place it into the second floating point register in the floating point register file. Contents of the first micro operand register 324 prescribe register EBX. The second provided displacement, 2, is provided in the second micro operand register 328.

During cycle 4, the first single-precision load micro instruction proceeds through the address stage. Therein, contents of the first and second operand registers 332, 334, the address components, are provided to the address logic 340. The address logic 340 uses these components, along with a segment base address, to compute the first address. The first address is placed into the address register 346. Also during cycle 4, the second single-precision load micro instruction, FLDSP [EBX+6], proceeds through the register stage. Therein, contents of register EBX are, again, retrieved from the integer register file 330 and are provided to first operand register 332. In addition, the second provided displacement, 6, is placed in the second operand register 334 and the micro opcode is placed into register 336. Also during cycle 4, a next macro instruction proceeds through the translate stage.

During cycle 5, the first single-precision load micro instruction proceeds through the data/ALU stage. Therein, the micro opcode in register 348 causes data/ALU logic to retrieve the first single-precision operand, a 32-bit block of data, from memory 350 at the first address provided in the address register 346. The first single-precision operand is placed in the result register 354 and the micro opcode is placed into register 356. Also during cycle 5, the second single-precision load micro instruction proceeds through the address stage. Therein, contents of the first and second operand registers 332, 334 are provided to the address logic 340. The address logic 340 computes the second address as described above. The second address is placed into the address register 346.

During cycle 6, the first micro instruction proceeds through the write back stage. Therein, the micro opcode in register 356 directs the write back logic 360 to write the first single-precision operand, contained in the result register 354, into the first floating point register. The write back logic 360 thus places the first single-precision operand into the first floating point register via bus 364. At this point, execution of the first macro instruction is complete. Also during cycle 6, the second single-precision load micro instruction proceeds through the data/ALU stage. Therein, the micro opcode in register 348 causes data/ALU logic to retrieve the second single-precision operand, a 32-bit block of data, from memory 350 at the second address provided in the address register 346. The second single-precision operand is placed in the result register 354 and the micro opcode is placed into register 356.

During cycle 7, the second micro instruction proceeds through the write back stage. Therein, the micro opcode in register 356 directs the write back logic 360 to write the second single-precision operand, contained in the result register 354, into the second floating point register. The write back logic 360 thus places the second single-precision operand into the second floating point register via bus 364. At this point, execution of the second macro instruction is complete.

The example of FIGS. 3 and 4 illustrate that two cycles of the pipeline clock are required to load the two single-precision operands. This is because x86 instructions only support loads of individual floating point operands. This is a problem that becomes particularly evident when a graphics application is executed. To load thousands of adjacently located single-precision operands, because of the architecture of present day microprocessors, wastes valuable execution time. Thus, graphics applications are unnecessarily burdened. One skilled in the art will appreciate that elimination of unnecessary pipeline cycles in the execution of any instruction, or combination of instructions, without requiring additional hardware, is very desirable.

The present invention permits a microprocessor to load two adjacent single-precision operands into two floating point registers in a single pipeline cycle. An x86 macro instruction extension, i.e., a double load macro instruction, directs the microprocessor to load a 64-bit data block from a first prescribed address in memory. The 64-bit data block is then parsed into first and second single-precision operands. The operands are concurrently loaded to first and second floating point registers during write back. Thus, computation of a second address for the second single-precision operand and sequential write back of the operands are eliminated. The time to load two single-precision operands is essentially cut in half.

Figure 5:
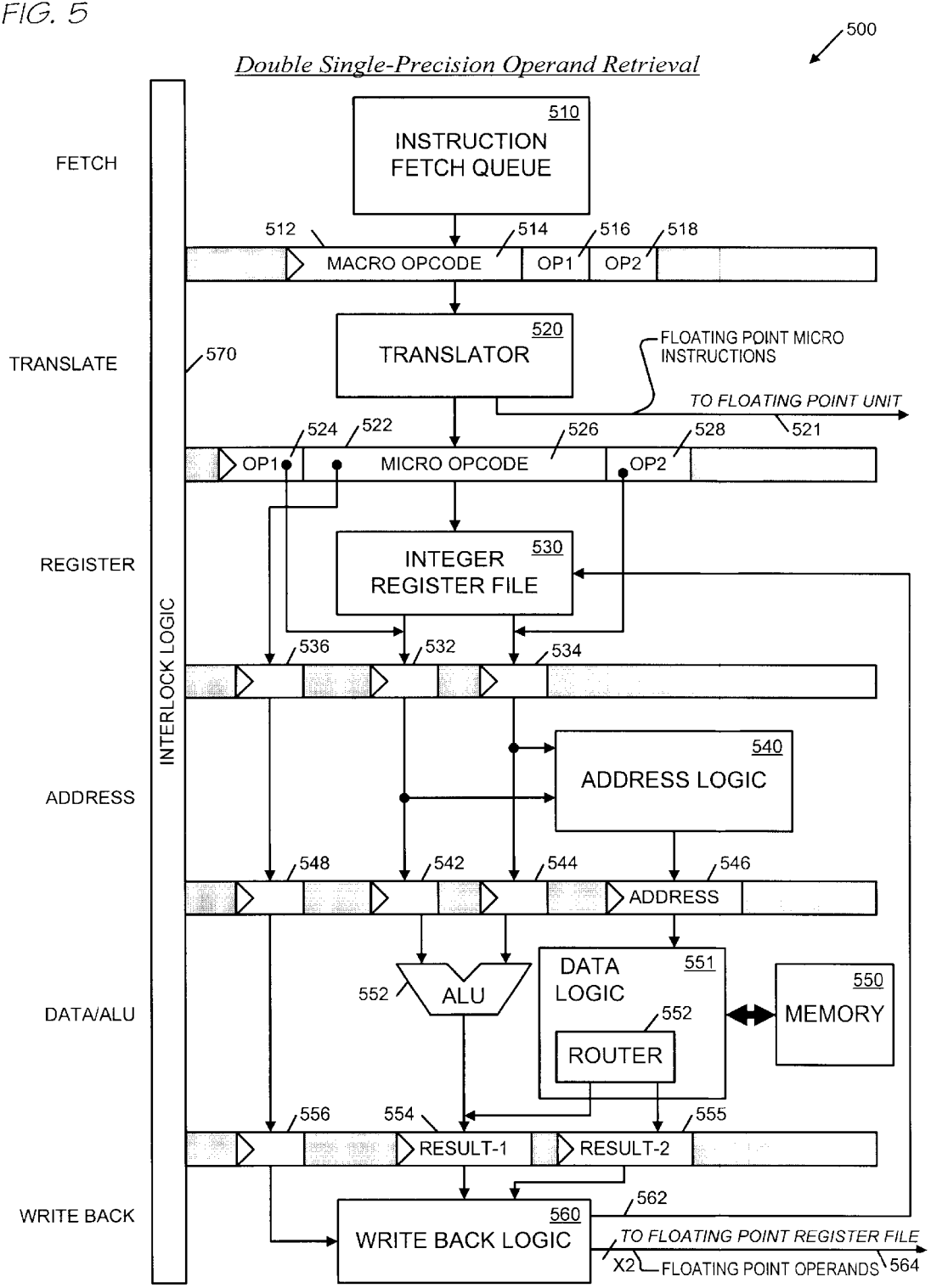
FIG. 5 is a block diagram of a pipeline microprocessor according to the present invention for retrieving single-precision operands from memory.

Now referring to FIG. 5, a block diagram of a pipeline microprocessor 500 according to the present invention is presented. For clarity, floating point logic stages are not shown in the block diagram because they are not relevant to this discussion. The block diagram shows six pipeline stages associated with retrieval of single-precision operands: fetch, translate, register, address, data/ALU, and write back. The microprocessor 500 also includes interlock logic 570.

The fetch stage has an instruction fetch queue 510 connected to an instruction buffer 512. The translate stage has a translator 520 that provides an output to a micro instruction buffer 522. The register stage has an integer register file 530. Outputs of the integer register file 530 are provided to first and second operand registers 532, 534. The address stage has address logic 540, which provides an output to an address register 546. The data/ALU stage has and arithmetic logic unit (ALU) 552, which provides an output to a first result register 554. Data logic 551 fetches operands from memory 550 and provides them to the first result register 554 and a second result register 555. The write back stage includes write back logic 560, which provides integer outputs to the integer register file 530 over an integer write back bus 562 and floating point outputs to the floating point register file over a floating point write back bus 564. The floating point write back bus 564 can write back two operands to two different floating point registers within a single write back cycle.

In operation, the instruction fetch queue 510 fetches macro instructions from memory 550 for execution by the microprocessor 500. Interface of the instruction fetch queue 510 to memory 550 is not shown. The macro instructions are sequentially provided to the instruction buffer 512. The instruction buffer 512 has three fields: a macro opcode field 514, a first macro operand field 516, and a second macro operand field 518. The macro opcode field 514 directs the microprocessor 500 to perform an operation related to operands provided in the first and second macro operand fields 516, 518. Contents of the fields 516, 518 may either directly provide the operands, or they may specify register locations, or they may contain address components from which addresses in memory are derived by logic in later stages of the pipeline. In the case of a double load macro instruction, contents of the macro opcode field 514, i.e., the macro opcode, would direct the microprocessor 500 to derive an address in memory 550 of a data block containing the two single-precision operands using address components provided in the first and second macro operand fields 516, 518. Furthermore, the macro opcode would direct the microprocessor 500 to retrieve the two single-precision operands from the derived address and load a first single-precision operand into a prescribed register and a second single-precision operand into a next register in the floating point register file. The registers where the retrieved operands are to be placed are implicitly specified by the macro opcode.

The translator 520 retrieves a macro instruction from the macro instruction buffer 512 and decodes it into an associated sequence of micro instructions. Micro instructions directed to the floating point unit are provided on bus 521. Micro instructions directed to the integer unit are provided to the integer micro instruction buffer 522. The integer micro instruction buffer 522 has three fields. Contents of a micro opcode field 526 direct the integer unit to perform a specific subtask. Operands are provided in first and second micro operand fields 524, 528. A double load macro instruction is decoded into a double load micro instruction. Thus, the micro opcode field 526 directs the microprocessor 500 to derive the address of the data block comprising the two single-precision operands using the address components provided in the first and second micro operand fields 524, 528. The micro opcode field 526 also directs the microprocessor 500 to load the first single-precision operand into the prescribed register and the second single-precision operand into the next register in the floating point register file. Like the macro opcode, the micro opcode implicitly prescribes the registers where the retrieved operands are to be placed. Thus, micro instructions are provided to the integer unit of the microprocessor 500.

If the micro opcode so directs, contents of the integer register file 530 are retrieved and placed into the first and second operand registers 532, 534. Like the example provided with reference to FIG. 3, one method of addressing an operand in an x86-compatible microprocessor prescribes that contents of a register, say register EBX, in the integer register file 530, be added to contents of the second micro operand register 528, a displacement, to form an effective address within a memory segment. Hence, contents of register EBX are retrieved from the integer register file 530 and are placed into the first operand register 532. The displacement is placed into the second operand register 534. Likewise, the micro opcode is placed into the opcode register 536.

Address logic 540 in the address stage uses the contents of the first and second operand registers 532, 534, along with contents of a segment base register (not shown) to derive the address of the 64-bit data block specified for retrieval by the micro opcode. This address is placed into the address register 546. Additionally, if the micro opcode so directs, contents of registers 536, 532, and 534 are provided to registers 548, 542, and 544, respectively.

Logic in the data/ALU stage performs accesses to memory 550 and also integer calculations. The ALU 552 performs integer calculations on the operands provided in registers 542 and 544. If the micro opcode in register 548 directs retrieval of an operand from memory 550, then data logic 551 in the data/ALU stage accesses the memory 550 at the address provided in the address register 546 and retrieves a data block of a size prescribed by the micro opcode. When a double load micro instruction is executed, the micro opcode directs the data logic 551 to retrieve the 64-bit data block. The data logic 551 retrieves the 64-bit data block and parses the block into the first and second single-precision operands. A router 552 provides the first single-precision operand in result-1 register 554 and the second single-precision operand in result-2 register 555. If the micro opcode directs a computational operation in the ALU 552, then a computational result from the ALU 552 is placed into the result-1 register 554. Additionally, the micro opcode is provided to register 556.

The write back logic 560 retrieves results from the result registers 554, 555 and, if specified by the micro opcode, updates registers in the integer register file 530 over the bus 562. The write back logic 560 also provides operands to the floating point register file over bus 564. For floating point operand loads, contents of register 556, the micro opcode, prescribe the format of the retrieved operands in the result registers 554, 555 and their target registers in the floating point register file. Because the write back logic 560 can write back two floating point operands to two different registers in the floating point register file during a single-write back cycle, the time to load the first and second single-precision operands is effectively cut in half.

In one embodiment of the present invention, the prescribed and next registers in the floating point register file are implicitly prescribed in the double load micro instruction micro opcode. In an alternative embodiment of the present invention, only the prescribed register is prescribed in the double load micro instruction micro opcode; the write back logic 560 derives the location of the next register based upon the location of the prescribed register.

When an instruction requires more than one pipeline cycle to execute in a given stage of the microprocessor 500, the interlock logic 570 inserts slips into the pipeline to preclude following instructions from prematurely advancing.

As described above, execution of a double load macro instruction in an x86-compatible microprocessor 500 according to the present invention causes two single-precision operands to be loaded in the same amount of time required to load a single single-precision operand in a conventional microprocessor. It follows then, that retrieval of 1,000 adjacent single-precision floating point operands requires execution of only 500 associated double load macro instructions. One skilled in the art will appreciate that roughly 500 machine cycles have been eliminated over an equivalent operation discussed with reference to the microprocessor 300 of FIG. 3. Execution of a double load macro instruction is more thoroughly described with reference to FIG. 6.

FIG. 6 is a table 600 illustrating execution of a double load macro instruction by the microprocessor 500 of FIG. 5 to retrieve two single-precision operands adjacently located in memory 550. For clarity purposes, depiction of the fetch stage is not depicted because it is not relevant to the discussion. The double load macro instruction is designated by FLD2 [EBX+2]. It directs the microprocessor 500 to compute an address in memory 550 for two single-precision operands based upon contents of register EBX in the integer register file 530 and a displacement, 2. It also directs that a 64-bit data block be retrieved from memory 550. It furthermore directs that the 64-bit data block be parsed into a first single-precision operand and a second single-precision operand and that the first single-precision operand be loaded into a first floating point register and the second single-precision operand be loaded into a second floating point register. It directs the microprocessor 500 to load both of the operands into their target registers during a single write back cycle. The first floating point register is implicitly prescribed by the double load macro instruction. In one embodiment of the present invention, the second floating point register is also implicitly prescribed by the double load micro instruction. In an alternative embodiment, only the first floating point register is prescribed; the write back logic 560 derives the second floating point register based upon the first. Progression of the double load macro instruction through the microprocessor 500 is shown with respect to cycles of a pipeline clock. Instructions before and after instructions of interest are designated by "***."

During cycle 2, the double load macro instruction, FLD2 [EBX+2], proceeds through the translate stage of the pipeline. The translator 520 retrieves the double load macro instruction from the macro instruction buffer 514. Contents of the first macro operand register 516 prescribe register EBX. The displacement, 2, is contained in the second macro operand register 518. The translator 520 decodes the double load macro instruction into a double load single-precision micro instruction, designated by FLD2SP [EBX+2]. It directs the microprocessor 500 to compute the address as described above, to retrieve the 64-bit data block from memory 550, to parse the 64-bit data block into the first and second single-precision operands, and to place them into their respectively prescribed target registers in the floating point register file. Contents of the first micro operand register 524 prescribe register EBX. The displacement, 2, is provided in the second micro operand register 528.

During cycle 3, the double load single-precision micro instruction, FLD2SP [EBX+2], proceeds through the register stage. Therein, contents of register EBX are retrieved from the integer register file 530 and are provided to the first operand register 532. In addition, the displacement, 2, is placed in the second operand register 534 and the micro opcode is placed into register 536. Also during cycle 3, a next macro instruction proceeds through the translate stage.

During cycle 4, the double load single-precision micro instruction proceeds through the address stage. Therein, contents of the first and second operand registers 532, 534, the address components, are provided to the address logic 540. The address logic 540 uses these components, along with a segment base address, to compute the address of the 64-bit data block in memory 550. The address is placed into the address register 546.

During cycle 5, the double load single-precision micro instruction proceeds through the data/ALU stage. Therein, the micro opcode in register 548 causes data logic 551 to retrieve the 64-bit data block from memory 550 at the address provided in the address register 546. The 64-bit data block is parsed into the first and second single-precision operands. The router 552 then places the first single-precision operand is into result-1 register 554 and the second single-precision operand into result-2 register 555. The micro opcode is placed into register 556.

During cycle 6, the double load single-precision micro instruction proceeds through the write back stage. Therein, the micro opcode in register 556 directs the write back logic 560 to load the first single-precision operand into the first floating point register and the second single-precision operand into the second floating point register, during the same write cycle. The write back logic 560 thus places both single-precision operands into their respective target registers via bus 564. At this point, execution of the double load macro instruction is complete.

The example of FIGS. 5 and 6 illustrate that only one cycle of the pipeline clock is required to load the two single-precision operands. This is a 50 percent savings in execution time over the example described with reference to FIGS. 3 and 4. The problem of loading more than one single-precision operand via an x86 macro instruction using x86 addressing conventions is overcome through employment of the present invention. Benefits are particularly evident when a graphics application is executed. Thousands of adjacently located single-precision operands can now be loaded in roughly half the time required by conventional microprocessors. One skilled in the art will acknowledge that the improvement provided by the present invention, is very advantageous.

Figure 7:
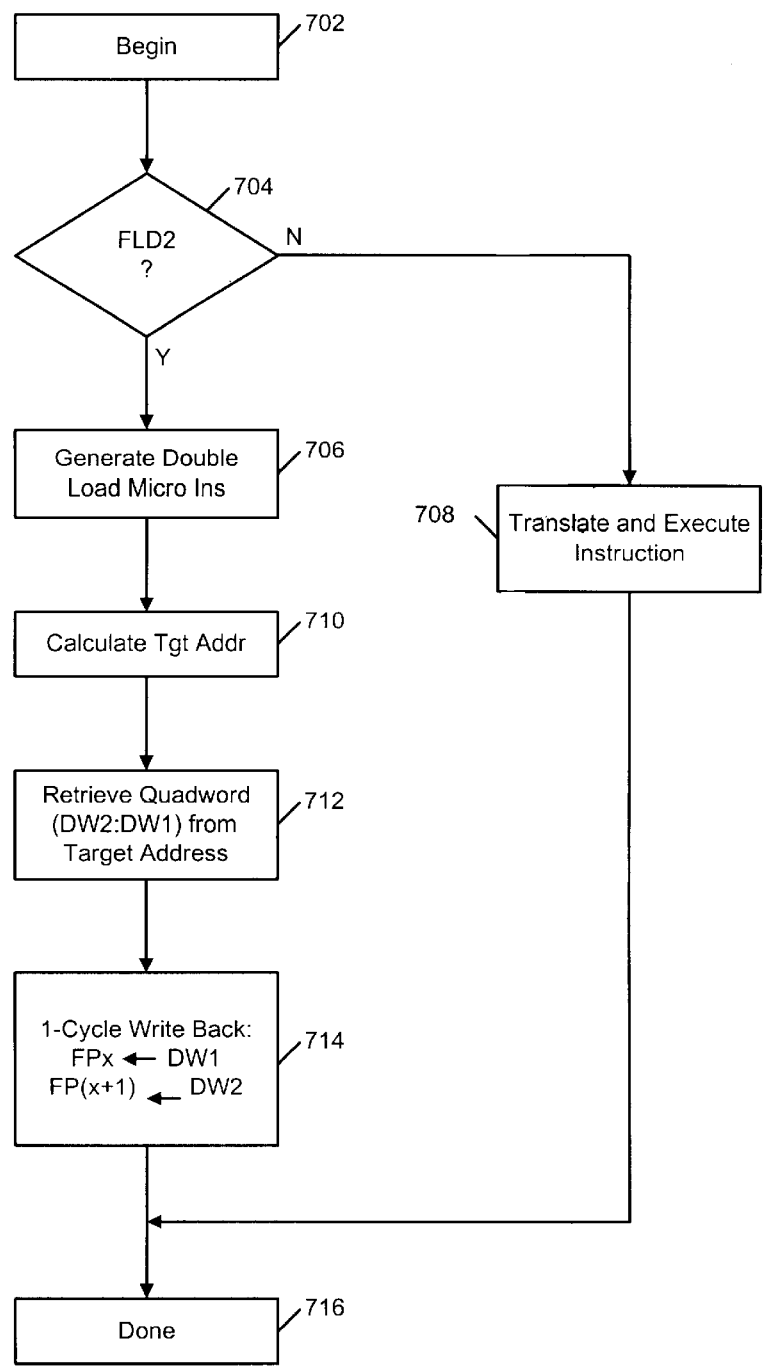
FIG. 7 is a flow chart illustrating a method according to the present invention for loading singleprecision operands in a pipeline microprocessor during write back of a single instruction.

Now referring to FIG. 7, a flow chart 700 is presented illustrating a method according to the present invention for loading single-precision operands in a pipeline microprocessor during write back of a single instruction.

Flow begins at block 702 where a macro instruction is fetched from a macro instruction buffer. Flow then proceeds to decision block 704.

At decision block 704, the macro instruction is evaluated to determine if it is a double load macro instruction. If so, then flow proceeds to block 706. If not, then flow proceeds to block 708.

At block 708, the macro instruction is decoded by a translator into an associated micro instruction sequence. The associated micro instruction sequence is then executed by the microprocessor.

At block 706, the double load macro instruction is decoded by the translator into an associated double load single-precision micro instruction. Flow then proceeds to block 710.

At block 710, an address in memory containing a 64-bit data block is calculated by address logic in the microprocessor using address components provided in the double load single-precision micro instruction. Flow then proceeds to block 712.

At block 712, the 64-bit data block, a quadword, is retrieved from the address calculated in block 710. Flow then proceeds to block 714.

At block 714, a first single-precision operand, DW1, and a second single-precision operand, DW2, are extracted from the 64-bit data block. Both DW1 and DW2 are loaded into prescribed registers in the floating point register file during a single write back cycle. DW2 is loaded into a register one address higher than the register prescribed for DW1. Flow then proceeds to block 716.

At block 716, the method completes.

Although the present invention and its objects, features, and advantages have been described in detail, other embodiments are encompassed by the invention. For example, the present invention has been particularly described in terms of target registers for two single-precision operands being implicitly specified as part of a double load macro instruction. But, the scope of the present invention is not restricted to encompass only implicit prescription of target registers; registers may be explicitly prescribed by additional instruction extensions.

In addition, the present invention has been specifically characterized as providing the capability to load two single-precision floating point operands in a single write back cycle. And, albeit single-precision operands are prevalent in present day graphics applications, the extent of the present invention reaches to the two other industry standard formats, double-precision and extended-precision, as well.

Furthermore, the present invention has been characterized primarily with regard to loading single-precision operands into registers in a microprocessor. It is immaterial, however, from what host platform the calculation is performed. Rather, it can be performed upon any platform having an execution unit that processes floating point operands as described herein to include signal processors, embedded controllers, array processors, and industrial controllers.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A microprocessor for executing a load macro instruction, the load macro instruction directing the microprocessor to load two single-precision operands into two floating point registers, the microprocessor comprising:

translation logic, configured to receive the load macro instruction, the load macro instruction prescribing an address, and to decode the load macro instruction into a double load micro instruction, wherein said double load micro instruction directs the microprocessor to retrieve the two single-precision operands from said address and to load the two single-precision operands into the two floating point registers;

data logic, coupled to said translation logic, configured to receive and execute said double load micro instruction, and to retrieve the two single-precision operands from said address; and write back logic, coupled to said data logic, configured to load the two single-precision operands into the two floating point registers during a single write cycle.

2. The microprocessor as recited in claim 1, wherein said data logic retrieves a 64-bit data block from said location, said 64-bit data block comprising:

a first single-precision operand, located at said address; and a second single-precision operand, located at a second address adjacent to said first single-precision operand.

3. The microprocessor as recited in claim 2, wherein said load macro instruction prescribes a first floating point register for load of said first single-precision operand.

4. The microprocessor as recited in claim 3, wherein said double load micro instruction comprises:

a first floating point register field, specifying said first floating point register.

5. The microprocessor as recited in claim 4, wherein said write back logic determines a second floating point register for load of said second single-precision operand.

6. The microprocessor as recited in claim 5, wherein said second floating point register is adjacent to said first floating point register.

7. The microprocessor as recited in claim 4, wherein said double load micro instruction further comprises:

a second floating point register field, specifying a second floating point register for load of said second single-precision operand.

8. The microprocessor as recited in claim 2, wherein said data logic comprises:

a router, configured to extract a first single-precision operand and a second single-precision operand from said 64-bit data block.

9. The microprocessor as recited in claim 1, further comprising:

a floating point register file, coupled to said write back logic, for receiving the two single-precision operands during said single write cycle.

10. The microprocessor as recited in claim 9, wherein said floating point register file comprises a first write port and a second write port, said write ports capable of simultaneously being written.

11. An apparatus for employing a load macro instruction to load two single-precision operands into two floating point registers in a microprocessor, the apparatus comprising:

translation logic, configured to receive the load macro instruction prescribing an address of the two single-precision operands, and to decode the load macro instruction into a double load micro instruction, wherein said double load micro instruction directs the microprocessor to retrieve a 64-bit data block from said address and to load the two single-precision operands into the two floating point registers;

data logic, coupled to said translation logic, configured receive and execute said double load micro instruction, and to retrieve said 64-bit data block from said address, said data logic comprising:

a router, configured to extract a first single-precision operand and a second single-precision operand from said 64-bit data block; and write back logic, coupled to said data logic, configured to load said first single-precision operand into a first floating point register and said second single-precision operand into a second floating point register during a single write cycle.

12. The microprocessor as recited in claim 11, wherein said first single-precision operand is located at said address and said second single-precision operand is located at a second address directly adjacent to said first single-precision operand.

13. The microprocessor as recited in claim 11, wherein said load macro instruction prescribes said first floating point register.

14. The microprocessor as recited in claim 13, wherein said double load micro instruction comprises:
   a first floating point register field, specifying said first floating point register.

15. The microprocessor as recited in claim 14, wherein said write back logic determines said second floating point register.

16. The microprocessor as recited in claim 15, wherein said second floating point register is adjacent to said first floating point register.

17. The microprocessor as recited in claim 14, wherein said double load micro instruction further comprises:
   a second floating point register field, specifying said second floating point register for load of said second single-precision operand.

18. The microprocessor as recited in claim 11, further comprising:
   a floating point register file, coupled to said write back logic, for receiving the two single-precision operands during said single write cycle.

19. The microprocessor as recited in claim 18, wherein said floating point register file comprises a first write port and a second write port, said write ports capable of being simultaneously written.

20. An apparatus in a microprocessor for performing a double load of single-precision operands, the double load being responsive to execution of a double load macro instruction by the microprocessor, the apparatus comprising:
   a decoder, for receiving and translating the double load macro instruction, said double load macro instruction comprising:
      an operand format field, indicating that the double load is to be performed on operands in single-precision format;
      address component fields, prescribing a location of a first single-precision operand; and
      a register specifier field, specifying a first floating point register into which said first single-precision operand is to be loaded; and
   data access logic, coupled to said decoder, for concurrently retrieving said first single-precision operand and a second single-precision operand, wherein said second single-precision operand is located in memory next to said first single-precision operand.

21. The apparatus as recited in claim 20, further comprising:
   data routing logic, coupled to said data access logic, for providing said first single-precision operand to said first floating point register, and for providing said second single-precision operand to a second floating point register; and
   a floating point register file, coupled to said data routing logic, for receiving said first and second single-precision operands in parallel during a write back cycle, said floating point register file comprising:
      two write ports, in parallel, each of said write ports capable of writing a provided operand into a specified floating point register.

22. The apparatus as recited in claim 21, wherein said address component fields prescribe said location according to x86-compatible addressing convention.

23. The apparatus as recited in claim 21, wherein said decoder translates said double load macro instruction into an associated micro instruction, said associated micro instruction comprising:
   a first register field, indicating said first floating point register.

24. The apparatus as recited in claim 23, wherein said associated micro instruction further comprises:
   a second register field, indicating said second floating point register.

25. The apparatus as recited in claim 23, wherein said data routing logic specifies said second floating point register to one of said write ports during said write back cycle.

26. A method in a microprocessor for loading two single-precision operands into two floating point registers during a single write cycle, the method comprising:
   a) providing a double load macro instruction, the double load macro instruction prescribing an address of the two single precision operands, and directing the microprocessor to concurrently load the two single-precision operands from memory;
   b) translating the double load macro instruction into a double load micro instruction that directs the microprocessor to retrieve a 64-bit data block and to parse the 64-bit data block into the two single-precision operands; and
   c) loading the two single-precision operands into the two floating point registers during write back of the double load micro instruction.

27. The method as recited in claim 26, wherein said providing comprises:
   i) prescribing a first floating point register, into which a first single-precision operand is to be loaded.

28. The method as recited in claim 27, wherein said translating comprises:
   i) specifying the first floating point register in the double load micro instruction.

29. The method as cited in claim 28, wherein said translating further comprises:
   ii) specifying a second floating point register in the double load micro instruction, into which a second single-precision operand is to be loaded.

30. The method as recited in claim 28, wherein said loading comprises:
   i) writing the first single precision operand into the first floating point register;
   ii) determining a second floating point register, into which a second single-precision operand is to be written; and
   iii) writing the second single-precision operand into the second floating point register;
   wherein the first and second floating point registers are adjacently located.

* * * * *